United States Patent [19]
Eickemeyer et al.

[11] Patent Number: 6,061,710
[45] Date of Patent: May 9, 2000

[54] MULTITHREADED PROCESSOR INCORPORATING A THREAD LATCH REGISTER FOR INTERRUPT SERVICE NEW PENDING THREADS

[75] Inventors: Richard James Eickemeyer; Harold F. Kossman, both of Rochester, Minn.

[73] Assignee: International Business Machines Corporation, Armonk, N.Y.

[21] Appl. No.: 08/960,744

[22] Filed: Oct. 29, 1997

[51] Int. Cl.[7] ...................................................... G06F 9/46
[52] U.S. Cl. ........................ 709/107; 709/108; 710/260; 712/228; 712/229
[58] Field of Search .................................. 709/7, 9, 107, 709/108; 712/21, 228, 229; 710/260

[56] References Cited

U.S. PATENT DOCUMENTS

| | | | |
|---|---|---|---|
| 5,079,725 | 1/1992 | Geer et al. | 714/726 |
| 5,148,536 | 9/1992 | Witek et al. | 711/140 |
| 5,179,702 | 1/1993 | Spix et al. | 709/102 |
| 5,197,138 | 3/1993 | Hobbs et al. | 712/224 |
| 5,287,508 | 2/1994 | Hejna, Jr. et al. | 709/102 |
| 5,339,415 | 8/1994 | Strout, II et al. | 709/102 |
| 5,353,418 | 10/1994 | Nikhil et al. | 709/108 |
| 5,357,617 | 10/1994 | Davis et al. | 712/245 |
| 5,361,334 | 11/1994 | Cawley | 709/243 |
| 5,361,337 | 11/1994 | Okin | 712/228 |

(List continued on next page.)

FOREIGN PATENT DOCUMENTS 2 234 613   2/1991   United Kingdom .

OTHER PUBLICATIONS

Dongarra, J. J., "A Survey of High Performance Computers", *U.S. Government Work*, pp. 8–11 (Jan. 10, 1986).

Eickemeyer, R. J. et al., "Evaluation of Multithreaded Uniprocessors for Commercial Application Environments", *ISCA*, pp. 203–212 (May 1996).

Iannucci, R. A., "Two Fundamental Issues in Multiprocessing", Laboratory for Computer Science, Massachusetts Institute of Technology, Proceeding of the DFVLR Conference, pp. 61–88 (Jun. 25–29, 1987).

Kuck, D. J. et al., "The Burroughs Scientific Processor (BSP)", *IEEE Transactions on Computers*, C–31(5):363–376 (May 1982).

Song, P., "Multithreading Comes of Age", *Microdesign Resources*, pp. 13–18 (Jul. 14, 1997).

Thekkath, R. et al., "The Effectiveness of Multiple Hardware Contexts", Department of Computer Science and Engineering, FR–35, University of Washington, pp. 328–337 (1994).

Tomasulo, R. M., "An Efficient Algorithm for Exploring Multiple Arithmetic Units", *IBM Journal*, pp. 25–33 (Jan. 1967).

Weber W. et al., "Exploring the Benefits of Multiple Hardware Contexts in a Multiprocessor Architecture: Preliminary Results", The 16th Annual International Symposium on Computer Architecture, IEEE Computer Society Press, pp. 272–280 (1989).

Willis J. et al., "What is Data–driven, Multithreaded Architecture?", *IBM*, pp. 1–21 (Aug. 24, 1995).

IBM Technical Disclosure Bulletin, 39(8):113–116 (Aug. 1996).

(List continued on next page.)

*Primary Examiner*—Kenneth S. Kim
*Attorney, Agent, or Firm*—Merchant, Gould, Smith, Edell, Welter & Schmidt; Min Xu

[57] ABSTRACT

A method of using multithreading resources for improving handling instructions is operated by an improved multithreaded processor which includes a context select logic unit being arranged and configured for receiving and responding an interrupt including: a first controller for setting a pending thread latch when a hardware context is not available for executing a new thread for servicing the interrupt.

3 Claims, 6 Drawing Sheets

U.S. PATENT DOCUMENTS

| | | | |
|---|---|---|---|
| 5,404,469 | 4/1995 | Chung et al. | 712/215 |
| 5,404,521 | 4/1995 | Murray | 709/5 |
| 5,430,850 | 7/1995 | Papadopoulos et al. | 709/303 |
| 5,471,593 | 11/1995 | Branigin | 712/235 |
| 5,490,272 | 2/1996 | Mathis et al. | 709/108 |
| 5,499,349 | 3/1996 | Nikhil et al. | 712/26 |
| 5,515,538 | 5/1996 | Kleiman | 710/260 |
| 5,535,361 | 7/1996 | Hirata et al. | 711/145 |
| 5,574,939 | 11/1996 | Keckler et al. | 712/24 |
| 5,613,114 | 3/1997 | Anderson et al. | 709/108 |
| 5,630,136 | 5/1997 | Davidson et al. | 709/106 |
| 5,694,603 | 12/1997 | Reiffin | 709/107 |
| 5,694,604 | 12/1997 | Reiffin | 709/107 |
| 5,742,782 | 4/1998 | Ito et al. | 712/210 |
| 5,815,727 | 9/1998 | Motomura | 712/1 |
| 5,944,816 | 8/1999 | Dutton et al. | 712/215 |

OTHER PUBLICATIONS

U.S. application ser. No. 08/473,692, filed Jun. 7, 1995.
U.S. application ser. No. 08/675,315, filed Jul. 3, 1996.
U.S. application ser. No. 08/957,002, filed Oct. 23, 1997.
U.S. application ser. No. 08/773,572, filed Dec. 27, 1996.
U.S. application ser. No. 08/761,378, filed Dec. 9, 1996.
U.S. application ser. No. 08/761,380, filed Dec. 9, 1996.
U.S. application ser. No. 08/761,379, filed Dec. 9, 1996.
U.S. application ser. No. 08/958,716, filed Oct. 23, 1997.
U.S. application ser. No. 08/956,875, filed Oct. 23, 1997.
U.S. application ser. No. 08/958,718, filed Oct. 23, 1997.
U.S. application ser. No. 08/956,577, filed Oct. 23, 1997.

MULTITHREADED PROCESSOR INCORPORATING A THREAD LATCH REGISTER FOR INTERRUPT SERVICE NEW PENDING THREADS

RELATED APPLICATION DATA

The present invention generally relates to the following U.S. applications, the subject matter of which is hereby incorporated by reference: (1) U.S. patent application entitled Method and Apparatus to force a thread switch in a multithreaded processor, U.S. Ser. No. 08/956,577, filing date Oct. 23, 1997); (2) U.S. patent application entitled Method and Apparatus for Selecting Thread Switch Events in a Multithreaded Processor, U.S. Ser. No., 08/958,716 filing date Oct. 23, 1997); (3) U.S. patent application entitled Forward Progress Guarantee in a Multithreaded Processor, U.S. Ser. No., 08/956,875 filing date Oct. 23, 1997); (4) U.S. patent application entitled Altering Thread Priorities in a Multithreaded Processor, U.S. Ser. No., 08/958,718 filing date Oct. 23, 1997); (5) U.S. patent application entitled Thread Switch Control in a Multithreaded Processor System, U.S. Ser. No., 08/957,002 filing date Oct. 23, 1997); (6) U.S. Ser. No. 08/773,572 filed Dec. 27, 1996 entitled Background Completion of Instruction and Associated Fetch Request in a Multithread Processor; (7) U.S. Ser. No. 08/761,378 filed Dec. 9, 1996 entitled Multi-Entry Fully Associative Transition Cache; (8) U.S. Ser. No. 08/761,380 filed Dec. 9, 1996 entitled Method and Apparatus for Prioritizing and Routing Commands from a Command Source to a Command Sink; (9) U.S. Ser. No. 08/761,379 filed Dec. 9, 1996 entitled Method and Apparatus for Tracking Processing of a Command; and (10) U.S. Ser. No. 08/473,692 filed Jun. 7, 1995 entitled Method and System for Enhanced Multithread Operation in a Data Processing System by Reducing Memory Access Latency Delays now abandoned and continued as Ser. No. 08/906,228.

FIELD OF THE INVENTION

The present invention relates in general to an improved method for and apparatus of a computer data processing system; and in particular, to an improved high performance multithreaded processor and method embodied in the hardware of the processor in the presence of branch instructions.

BACKGROUND OF THE INVENTION

The fundamental structure of a modern computer includes peripheral devices to communicate information to and from the outside world; such peripheral devices may be keyboards, monitors, tape drives, communication lines coupled to a network, etc. Also included in the basic structure of the computer is the hardware necessary to receive, process, and deliver this information to and from the outside world, including busses, memory units, input/output (I/O) controllers, storage devices, and at least one central processing unit (CPU), etc. By analogy, the CPU is the brain of the system since it executes the instructions which comprise a computer program and directs the operation of the other system components.

From the standpoint of the computer's hardware, most systems operate in fundamentally the same manner. Processors actually perform very simple operations quickly, such as arithmetic, logical comparisons, and movement of data from one location to another. Programs which direct a computer to perform massive numbers of these simple operations may offer the illusion that the computer is doing something sophisticated. What is perceived by the user as a new or improved capability of a computer system, however, may actually be the machine performing the same simple operations, but much faster. Therefore continuing improvements to computer systems require that these systems be made ever faster.

One measurement of the overall speed of a computer system, also called the throughput, is measured as the number of operations performed per unit of time. Conceptually, the simplest of all possible improvements to system speed is to increase the clock speeds of the various components, particularly the clock speed of the processor. For example, if everything runs twice as fast but otherwise works in exactly the same manner, the system should generally perform a given task in half the time. Computer processors which were constructed from discrete components years ago performed significantly faster by shrinking the size and reducing the number of components; eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by other techniques. However, physical size reductions cannot continue indefinitely and there are limits to continually increasing processor clock speeds. Attention has therefore been directed to other approaches for further improvements in overall speed of the computer system.

Without changing the clock speed, it is still possible to improve system speed by using multiple processors. The modest cost of individual processors packaged on integrated circuit chips has made this practical. The use of slave processors considerably improves system speed by off-loading work from the CPU to the slave processor. For instance, slave processors routinely execute repetitive and single special purpose programs, such as input/output device communications and control. It is also possible for multiple CPUs to be placed in a single computer system, typically a host-based system which services multiple users simultaneously. Each of the different CPUs can separately execute a different task on behalf of a different user, thus increasing the overall speed of the system to execute multiple tasks simultaneously. It is much more difficult, however, to improve the speed at which a single task, such as an application program, executes. Coordinating the execution and delivery of results of various functions among multiple CPUs is a challenging task. For slave I/O processors this is not as difficult because the functions are pre-defined and limited, but for multiple CPUs executing general purpose application programs it is much more difficult to coordinate functions because, in part, system designers do not know the details of the programs in advance. Most application programs follow a single path or flow of steps performed by the processor. While it is sometimes possible to break up this single path into multiple parallel paths, a universal application for doing so is still being researched. Generally, breaking a lengthy task into smaller tasks for parallel processing by multiple processors is done by a software engineer writing code on a case-by-case basis. This ad hoc approach is especially problematic for executing commercial programs which are not necessarily repetitive or predictable.

Thus, while multiple processors improve overall system performance, there are still many reasons to improve the speed of the individual CPU. If the CPU clock speed is given, it is possible to further increase the speed of the CPU, i.e., the number of operations executed per second, by increasing the average number of operations executed per clock cycle. A common architecture for high performance, single-chip microprocessors is the reduced instruction set computer (RISC) architecture characterized by a small simplified set of frequently used instructions for rapid execution, those simple operations performed quickly mentioned earlier. As semiconductor technology has advanced, the goal of RISC architecture has been to develop processors capable of executing one or more instructions on each clock cycle of the machine.

Another approach to increase the average number of operations executed per clock cycle is to modify the hardware within the CPU. This throughput measure, clock cycles per instruction, is commonly used to characterize architectures for high performance processors. Instruction pipelining and cache memories are computer architectural features that have made this achievement possible. Pipeline instruction execution allows subsequent instructions to begin execution before previously issued instructions have finished. Cache memories store frequently used and other data nearer the processor and allow instruction execution to continue, in most cases, without waiting the full access time of a main memory. Some improvement has also been demonstrated with multiple execution units with look ahead hardware for finding instructions to execute in parallel.

The performance of a conventional RISC processor can be further increased in the superscalar computer and the Very Long Instruction Word (VLIW) computer, both of which execute more than one instruction in parallel per processor cycle. In these architectures, multiple functional or execution units are provided to run multiple pipelines in parallel. In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as a predefined rules are satisfied.

For both in-order and out-of-order execution in superscalar systems, pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be executed until the data becomes available in the cache. Maintaining the requisite data in the cache necessary for continued execution and to sustain a high hit ratio, i.e., the number of requests for data compared to the number of times the data was readily available in the cache, is not trivial especially for computations involving large data structures. A cache miss can cause the pipelines to stall for several cycles, and the total amount of memory latency will be severe if the data is not available most of the time. Although memory devices used for main memory are becoming faster, the speed gap between such memory chips and high-end processors is becoming increasingly larger. Accordingly, a significant amount of execution time in current high-end processor designs is spent waiting for resolution of cache misses and these memory access delays use an increasing proportion of processor execution time.

And yet another technique to improve the efficiency of hardware within the CPU is to divide a processing task into independently executable sequences of instructions called threads. This technique is related to breaking a larger task into smaller tasks for independent execution by different processors except here the threads are to be executed by the same processor. When a CPU then, for any of a number of reasons, cannot continue the processing or execution of one of these threads, the CPU switches to and executes another thread. One technique is to incorporate hardware multithreading to tolerate memory latency. The term "multithreading" as defined in the computer architecture community is not the same as the software use of the term which means one task subdivided into multiple related threads. In the architecture definition, the threads may be independent. Therefore, the term "hardware multithreading" is often used to distinguish the two uses of the term "multithreading".

Multithreading permits the processors' pipeline(s) to do useful work on different threads when a pipeline stall condition is detected for the current thread. Multithreading also permits processors implementing non-pipeline architectures to do useful work for a separate thread when a stall condition is detected for a current thread. There are two basic forms of multithreading. A traditional form is to keep N threads, or states, in the processor and interleave the threads on a cycle-by-cycle basis. This eliminates all pipeline dependencies because instructions in a single thread are separated. The other form of multithreading is to interleave the threads on some long-latency event.

Traditional forms of multithreading involves replicating the processor registers for each thread. For instance, for a processor implementing the architecture sold under the trade name PowerPC™ to perform multithreading, the processor must maintain N states to run N threads. Accordingly, the following are replicated N times: general purpose registers, floating point registers, condition registers, floating point status and control register, count register, link register, exception register, save/restore registers, and special purpose registers. Additionally, the special buffers, such as a segment lookaside buffer, can be replicated or each entry can be tagged with the thread number and, if not, must be flushed on every thread switch. Also, some branch prediction mechanisms, e.g., the correlation register and the return stack, should also be replicated. Fortunately, there is no need to replicate some of the larger functions of the processor such as: level one instruction cache (L1 I-cache), level one data cache (L1 D-cache), instruction buffer, store queue, instruction dispatcher, functional or execution units, pipelines, translation lookaside buffer (TLB), and branch history table. When one thread encounters a delay, the processor rapidly switches to another thread. The execution of this thread overlaps with the memory delay on the first thread.

Existing multithreading techniques describe switching threads on a cache miss or a memory reference. A primary example of this technique may be reviewed in "Sparcle: An Evolutionary Design for Large-Scale Multiprocessors," by Agarwal et al., IEEE Micro Volume 13, No. 3, pp. 48–60, June 1993. As applied in a RISC architecture, multiple register sets normally utilized to support function calls are modified to maintain multiple threads. For example, eight overlapping register windows are modified to become four non-overlapping register sets, wherein each register set is a reserve for trap and message handling. This system discloses a thread switch which occurs on each first level cache miss that results in a remote memory request. While this system represents an advance in the art, modern processor designs often utilize a multiple level cache or high speed memory which is attached to the processor. The processor system then utilizes some well-known algorithm to decide what portion of its main memory store will be loaded within each level of cache. Therefore, each time a memory reference occurs which is not present within the first level of cache, the processor must attempt to obtain that memory reference from a second or higher level of cache.

Yet in the traditional multithreading methods, the presence of branch instructions becomes a major impediment to improving processor performance, especially in pipelined superscalar processors, since they control which instructions are executed next. This decision cannot be made until the branch is "resolved" or completed. Branch prediction techniques have been used to guess the correct instruction to execute—a correct path. As a result, these techniques are not perfect. This becomes more severe as processors are executing speculatively past multiple branches.

Multithreading is an effective way to improve system throughput. However, the execution time of a single task is not improved by the conventional processors. The slow execution time of a single task is considered a problem on commercial workloads where detecting intra-task parallelism is difficult.

It should thus be apparent that a need exists for an improved data processing system which can improve performance of a multithreaded processor in the presence of branch instructions and can speed up single tasks of the multithreaded processor.

SUMMARY OF THE INVENTION

The present invention relates in general to an improved method for and apparatus of a computer data processing system; and in particular, to an improved high performance multithreaded processor and method embodied in the hardware of the processor in the presence of branch instructions.

In accordance with the principles of the present invention, additional hardware components can be added to improve multithreaded processor performance in the presence of branch instructions. The environment in which the invention may be employed will be presented in the context of two typical types of multithreaded processors: (1) out-of-order execution processor with simultaneous multithreading; and (2) in-order execution processor with thread switching on cache misses. It will be appreciated by those skilled in the art that the present invention is also applicable to other types of multithreading processors and/or other multithreading variations. The two environment described herein should not be viewed as limiting. Further, in both cases described herein, the primary purpose of multithreading is to improve system throughput rather than single task performance. It will be appreciated by those skilled in the art that to improve single task performance, the compiler can split the task into threads and the hardware usually provides support to facilitate this. The present invention is also applicable to this modified system as well so as to improve single task performance.

Therefore, according to one aspect of the invention, there is provided a method of computer processing which comprises the steps of:

(a) executing a first thread of instructions by a multithreaded processor;

(b) receiving an interrupt by the processor;

(c) determining availability of hardware context for servicing the interrupt:

(1) if the hardware context is available, the processor starting an interrupt service on an available hardware context by executing an available thread for the interrupt service;

(2) if the hardware context is not available, the processor providing the interrupt service on the first thread and determining whether a new thread should be started: if a type of the interrupt requires a new thread to be started, a pending thread latch register is set so as to indicate that the new thread is on its waiting stage to be executed; if the type of the interrupt does not require the new thread to be started, the processor completes the interrupt service on the first thread; and (d) returning execution of the processor to where the first thread was interrupted.

According to a further aspect of the invention, there is provided a method as recited above and further comprising the steps of:

(e) completing execution of the first thread by the processor;

(f) determining by the processor whether there is a waiting thread to be executed:

(1) if there is a waiting thread to be executed, executing the waiting thread;

(2) if there is no waiting thread to be executed, indicating that the hardware context used by the first thread is available.

According to another aspect of the invention, there is provided a method of computer processing which comprises the steps of:

(a) dispatching an instruction from a first thread by a multithreaded processor; and (b) determining whether the instruction is a conditional branch type of instruction including a primary branch path and an alternate branch path:

(1) if the instruction is not a conditional branch type of instruction, the processor executing the instruction;

(2) if the instruction is a conditional branch type of instruction, the processor determining whether hardware context is available for both the primary branch path and the alternate branch path of the conditional branch type of instruction: if the hardware context is available, the processor providing the available hardware context for the primary and alternate branch paths on and executing the respective instruction on the primary and alternate branch paths; if the hardware context is not available, the processor selecting execution of the respective instruction on one of the branch paths.

According to a further another aspect of the invention, there is provided a method as recited above and further comprising the steps of:

(c) resolving a conditional branch which indicates to the multithreaded processor either the primary branch path or the alternate branch path of the conditional branch is a desired branch path;

(d) determining by the processor whether both the primary and alternate branch paths were executed in (b):

(1) if both branch paths were executed in (b), the processor canceling the undesired branch path, indicating that the hardware context used by the undesired branch path is available, determining whether a pending thread latch was set which indicates that there is at least one thread of instructions waiting for availability of the hardware context: if there is no pending thread latch was set, the processor continues execution of instructions following the desired branch path; if there is at least one pending thread latch was set, the processor executes one waiting thread on the available hardware context and clears the pending thread latch, if there is other waiting thread, the pending thread latch is set, and the processor continues execution of instructions following the desired branch path;

(2) if the processor only selected one of the primary branch path and the alternate branch path for execution in (b), comparing the desired branch path and the selected branch path: if the desired branch path is the selected branch path, the processor continues execution of instructions following the desired branch path; if the desired branch path is not the selected branch path, the processor cancels the selected branch path and starts execution instructions of the desired branch path and continues execution instructions following the desired branch path.

The invention is also a computer processor. In one embodiment, the computer processor comprises:

(a) a multithreaded processor arranged and configured for servicing an interrupt while executing a first thread of instructions; when a hardware context is not available for servicing the interrupt, the processor determining whether a new thread should be started for the interrupt: if a type of the interrupt requires a new thread to be started, a pending thread latch register is set so as to indicate that the new thread is on its waiting stage to be executed; if the type of the interrupt does not require the new thread to be started, the processor completing service for interrupt on the first thread; and (b) the pending thread latch register operatively connected to the multithreaded processor, wherein when a hardware context is later available, the multithreaded processor checks whether the pending thread latch was previously set, if it was set, the processor executing the new thread corresponding to the previously set pending thread latch on the available hardware context.

One aspect of the invention is a context select logic unit for a multithreaded processor. In one embodiment, the context select logic unit comprises:

(a) a status controller including a first controller member for checking availability of a hardware context for servicing an interrupt, a second controller member for determining whether a thread is on a primary branch path or an alternate branch path, a third controller member for containing a location address of the other branch path, a fourth controller member for enabling and disabling the hardware context, a fifth controller member for reserving the hardware context for the primary branch path, a sixth controller member for reserving the hardware context for the alternate branch path, and a seventh controller member for setting/resetting a pending thread latch in a control register indicating whether there is a waiting thread to be executed;

(b) a plurality of inputs including a first input for receiving an interrupt signal, a second input for receiving a thread completion signal, a third input for receiving dispatch conditional branch signal, a fourth input for receiving resolve conditional branch signal, a fifth input for setting/resetting a pending thread latch signal, wherein the processor checks the first controller to determine the availability of the hardware context for servicing an interrupt and determine whether the pending thread latch should be set so that a new waiting thread can be later executed once the hardware context is available, the processor determines whether an instruction is a conditional branch type of instruction including the primary branch path and the alternate branch path to check an address of the hardware context for the respective other branch path so that once the conditional branch is resolved, the address of either the primary branch path or the alternate branch path as being a desired branch path is identified; and (c) a plurality of outputs including a first output for sending the interrupt to an available hardware context, a second output for starting execution of the alternate branch path on the available hardware context, a third output for starting execution of the new waiting thread on the available hardware context, and a fourth output for terminating a hardware context so as to free the hardware context.

The invention is also a computer system which includes an improved multithreaded processor. In one embodiment, the computer system comprises:

(a) a central processing unit processing multiple threads;

(b) a main memory connecting to the central processing unit;

(c) a cache memory connecting between the central processing unit and the main memory; and (d) a context select logic unit being arranged and configured for receiving and responding to an interrupt from the system including means for setting a pending thread latch when a hardware context is not available for executing a new thread for servicing the interrupt, and means for processing instructions on a conditional branch when the hardware context is available for each branch path of the conditional branch such that upon resolving the conditional branch, the processing unit cancels an undesired branch path and continues execution of instructions following the desired branch path.

The invention is further a computer system. In one embodiment, the computer system comprises:

(a) a multithreaded processor having multiple hardware contexts for processing multiple threads; and (b) the multiple threads being normally processed on a primary branch path, upon presence of a conditional branch, an available hardware context being assigned to an alternate branch path.

In one embodiment of case (1) for an out-of-order execution multithreaded processor, the processor dispatches instructions from multiple threads, either simultaneously or on alternating cycles. In either case, at least two threads are present in the pipelines simultaneously. Consequently, there is no explicit thread switch. Furthermore, the threads either share a pool of renaming registers or have separate pools. This method allows two threads to cooperate on a single task by executing both paths following a conditional branch. The primary thread executes until an unresolved conditional branch. One of the branch path paths is executed on the primary thread, and the other path is executed on the other (or alternate) thread. The split or the decision may be made on the basis of taken vs. not-taken path, or on the basis of predicted vs. not predicted path. The newly starting thread receives a copy of registers at this time and a program counter (and potentially instructions already pre-fetched on its path). If the threads have distinct register pools, a register cell design of the multithreaded processor can be modified to allow all register values to be copied immediately (or continuously shadowed). If the threads share a register pool, no copying is generally needed. The threads each execute their respective instruction sequences. The conditional branch instruction is eventually resolved, and the thread executing the wrong or undesired branch path is disregarded, canceled, or "squashed". The thread executing the correct or desired branch path continues. The usual out-of-order execution features for instruction reordering and squashing of speculative results (in registers or in a store queue) are applied here to cancel the thread on the wrong branch path.

In one embodiment of case (2) for an in-order execution multithreaded processor, a thread switch takes place. A thread switch typically takes more cycles than it does to resolve a branch. In the in-order execution multithreaded processor, a thread switch is caused by a cache miss. There are two cases of interest—a data cache miss and an instruction cache miss. For a data cache miss, the present invention preferably considers a common instruction sequence of load-compare conditional branch. If there is a cache miss on the load, the compare and branch would have already dispatched, or the branch might not have dispatched but it would have been detected in the instruction buffer. A thread switch then takes place, and a new thread is one of the branch paths after the conditional branch (preferably the more likely branch). Since only one thread executes at a time, in this design, multithreading is used to start execution after the load miss. As a result, if there is a cache miss on this thread, the other branch path could be started in another thread. The branch paths each receive a copy of the registers, by means of an enhanced register cell design. Once the data cache miss completes, that thread resumes to resolve the branch. Similarly, if there is an instruction cache miss when fetching one path after a branch, a second thread can be used to start executing the other branch path. Once the conditional branch "resolves," after the data cache miss, a decision is made as to which thread should now execute. The correct thread continues with the program's execution. Since the thread switch takes multiple cycles, there may be cases where the other thread's branch-path execution should be canceled rather than resumed after a thread switch. It will be appreciated by one skilled in the art that if the number of cycles of execution down the correct path is less than the thread switch time, no switch threads are generally needed, thus execution continues in the currently running thread.

One advantage of the present invention is that it utilizes existing hardware with minimal additions to achieve a new method of improving processor performance and to overcome the shortcomings, such as imprecision, of using the traditional branch prediction in the presence of branch instructions.

Other advantages, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE ILLUSTRATED EMBODIMENTS

Figure 1:
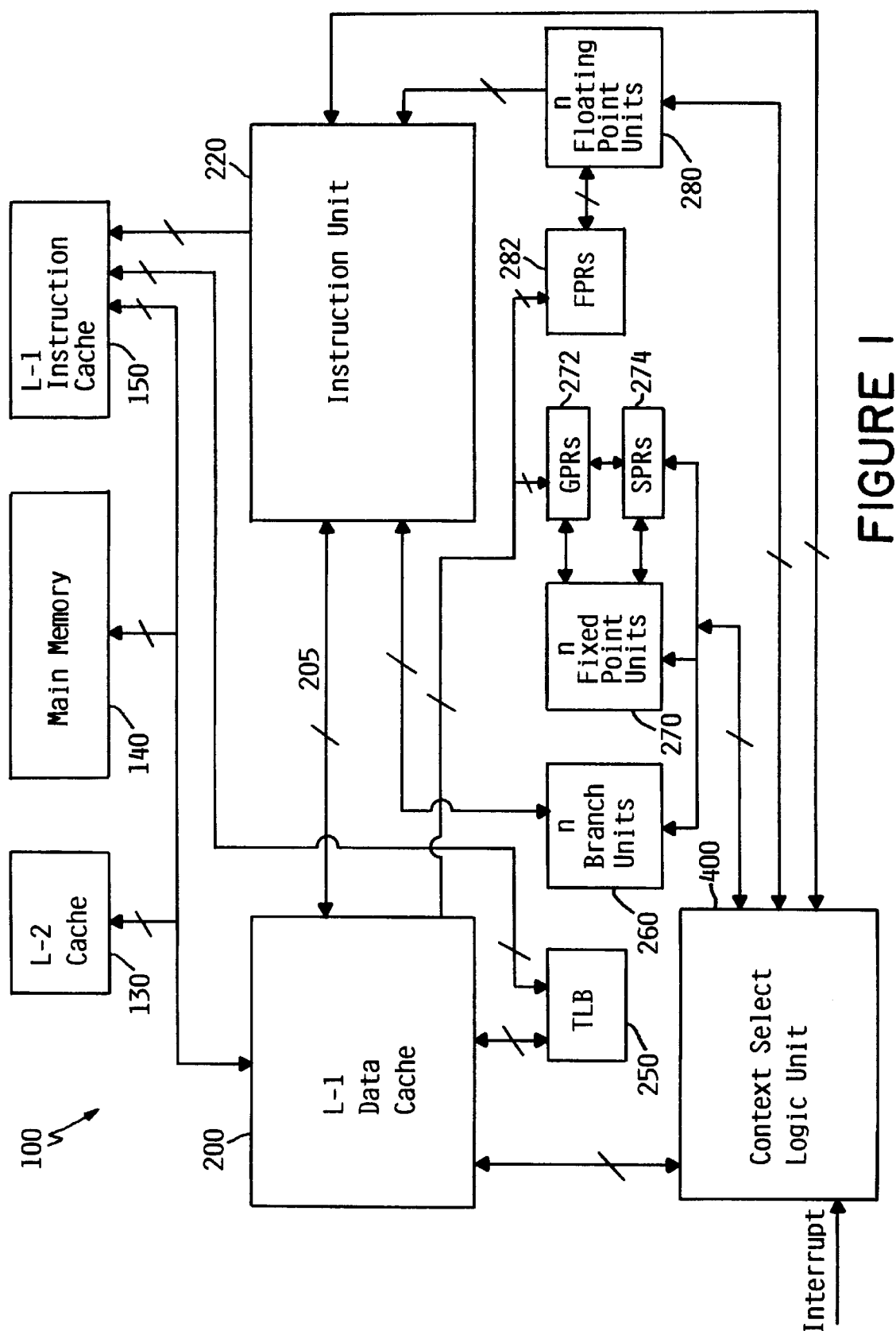
FIG. 1 is a block diagram of an exemplary computer system environment for use of a multithreaded processor generally consistent with the present invention.

With reference now to the figures and in particular with reference to FIG. 1, there is depicted a high level block diagram of a computer data processing system 100 which may be utilized to implement the method and system of the present invention. The primary hardware components and interconnections of a computer data processing system 100 arranged and configured for utilizing the present invention are shown in FIG. 1. A context select logic unit 400, for responding to interrupts (e.g. an external interrupt), software instructions, and hardware signals, is coupled to Level-1 data cache 200 which in turn is coupled to Level-2 cache 130, Level-1 instruction cache 150, and a main memory 140. The context select logic unit 400 is further coupled to an instruction unit 220 which is coupled to Level-1 data cache 200, Level-1 instruction cache 150. The instruction cache 150 stores instructions which are to be fed to the instruction unit 220 for execution. Data cache 200 stores data to be used by the instruction unit 220. The caches communicate with random access memory in main memory 140. Generally, the main memory 140, the data and instruction caches 200, 150, 130, and the instruction unit 220 communicate via bus interface with system bus. Various input/output processors (IOPs) can attach to the system bus and support communication with a variety of storage and input/output (I/O) devices, such as direct access storage devices (DASD), tape drives, remote communication lines, workstations, and printers, etc. It should be understood that FIG. 1 is intended to depict representative components of a computer data processing system 100 at a high level, and that the number and types of such components may vary.

Within the CPU, a processor core contains specialized functional units, each of which perform primitive operations, such as sequencing instructions, executing operations involving integers, executing operations involving real numbers, transferring values between addressable storage and logical register arrays. In a preferred embodiment, the processor core of the data processing system 100 is a single integrated circuit, pipelined, superscalar microprocessor, which may be implemented utilizing any computer architecture such as the family of RISC processors sold under the trade name PowerPC™; for example, the PowerPC™ 604 microprocessor chip sold by IBM.

As will be discussed below, the data processing system 100 preferably includes various units, registers, buffers, memories, and other sections which are all preferably formed by integrated circuitry. It should be understood that in the figures, the various data paths have been simplified; in reality, there are many separate and parallel data paths into and out of the various components. In addition, various components not germane to the invention described herein have been omitted, but it is to be understood that processors contain additional units for additional functions. The data processing system 100 can operate according to reduced instruction set computing, RISC, techniques or other computing techniques.

As further represented in FIG. 1, the processor core of the data processing system 100 preferably includes a level one data cache, Level-1 data cache 200, Level-2 cache 130, the main memory 140, and Level-1 instruction cache 150, all of which are operationally interconnected utilizing various bus connections. The Level-1 data cache 200 and Level-1 instruction cache 150 preferably are provided on chip as part of the processor while the main memory 140 and the Level-2 cache 130 are provided off chip. Memory system 140 is intended to represent random access main memory which may or may not be within the processor core and, and other data buffers and caches, if any, external to the processor core, and other external memory, for example, DASD, tape drives, and workstations. The Level-2 cache 130 is preferably a higher speed memory system than the main memory 140, and by storing selected data within the Level-2 cache 130, the memory latency which occurs as a result of a reference to the main memory 140 can be minimized. As shown in FIG. 1, the Level-2 cache 130 and the main memory 140 are directly connected to both the L1 I-cache 150 and the instruction unit 220.

Instructions from the Level-1 instruction cache 150 are preferably output to the instruction unit 220 which, in accordance with the method and system of the present invention, controls the execution of multiple threads by the various subprocessor units, e.g., branch units 260, fixed point units 270, and floating point unit 280 and others as specified by the architecture of the data processing system 100. In addition to the various execution units depicted within FIG. 1, those skilled in the art will appreciate that modern superscalar microprocessor systems often include multiple versions of each such execution unit which may be added without departing from the spirit and scope of the present invention. Most of these units will have as an input source operand information from various registers such as general purpose registers GPRs 272, and floating point registers FPRs 282. Additionally, multiple special purpose registers SPRs 274 may be utilized in accordance with the method and system of the present invention to store processor state information in response to thread operation including starting a thread, ending a thread, switching threads, etc. As shown in FIG. 1, the Level-1 data cache 200 is coupled to the general purpose registers 272 and the floating point registers 282. The general purpose registers 272 are connected to the special purpose registers 274. Further, both general purpose registers 272 and special purpose registers 274 are directly coupled to the fixed point units 270, respectively. Further, the branch units 260, the fixed point units 270, and the specific purpose registers SPRs 274 are coupled to each other. The floating point registers FPRs 282 is connected between the floating point units 280 and the Level-1 data cache 200. Further, a translation lookaside buffer TLB 250 is provided which contains virtual-to-real address mapping.

Figure 2:
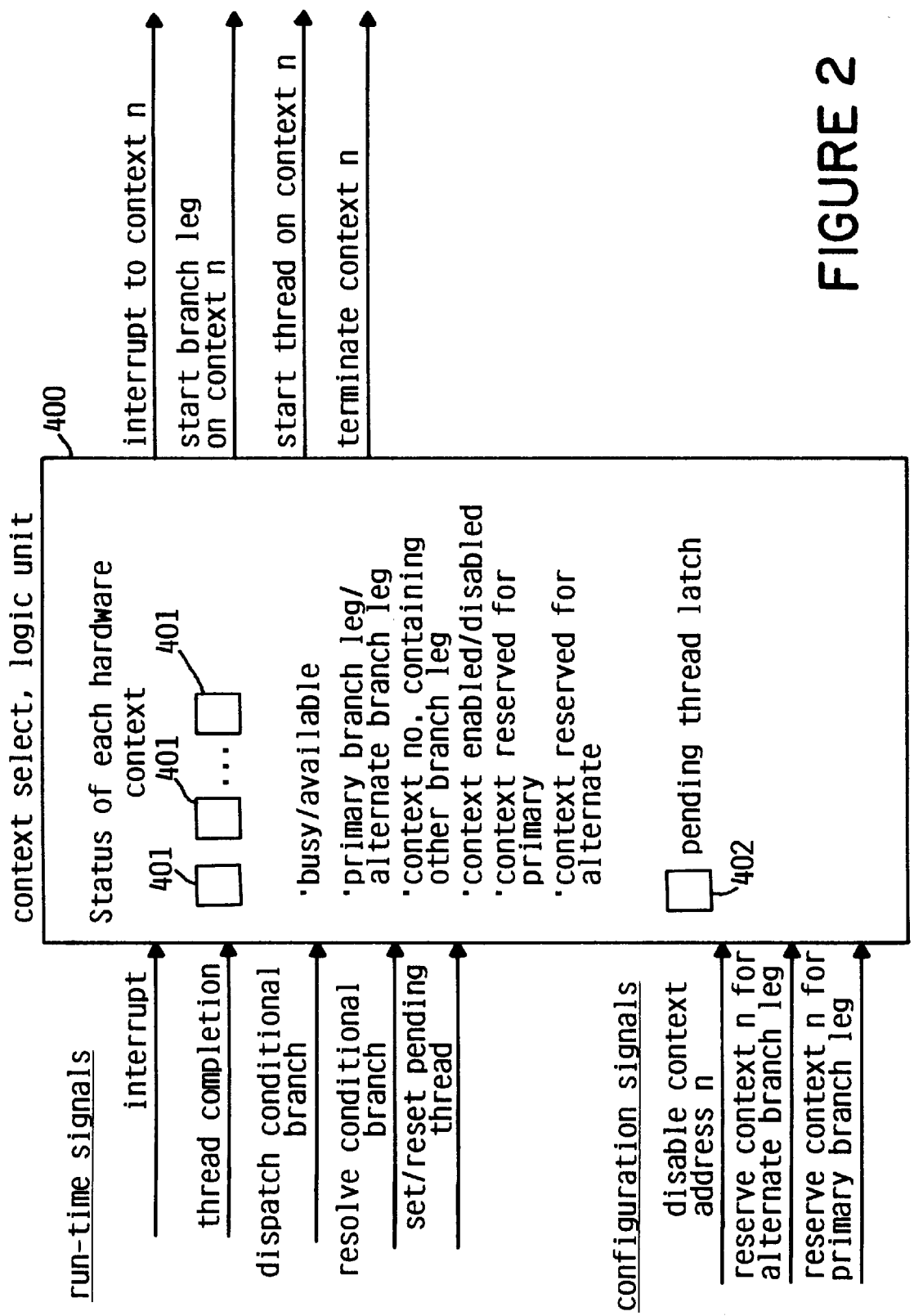
FIG. 2 is a block diagram of a context select logic unit, illustrating functions of the context select logic unit of the multithreaded processor in the presence of branch instructions, generally consistent with the invention.

Among the functional hardware units unique to this multithreaded processor is a context select logic unit 400. The context select logic unit 400 contains various registers that determine which thread will be the active or running thread, etc. In FIG. 1, an interrupt signal can be directed to the context select logic unit 400. The details of the functions of the context select logic unit 400 are shown in FIG. 2. In the context select logic unit 400, a plurality of registers representing status of each hardware context are generally illustrated. Each block 401 represents the association between the hardware context with the exemplary functions listed as follows (the following list of the functions is by no means exhaustive):

a) determining the availability of the hardware context: busy or available. The hardware context is busy when it starts a thread of instructions. The hardware context is made available (or free) when the thread of instructions is completed and no other threads are waiting for execution;

b) determining which branch path: primary branch path or alternate branch path on which a thread is executed;

c) containing the address of the hardware context of the other branch path, i.e. the address of the hardware context of the primary branch path is contained for the alternate branch path, and the address of the hardware context of the alternate branch path is contained for the primary branch path, so that after the conditional branch is resolved, the primary branch path and the alternate branch path, as one being the correct branch path and the other being the wrong branch path, can be identified by the addresses;

d) determining whether the hardware context is enabled or disabled;

e) determining whether the hardware context is reserved for primary branch path;

f) determining whether the hardware context is reserved for alternate branch path.

Furthermore, the context select logic unit 400 includes a block 402 which represents a register for setting or resetting a pending thread latch. The details regarding setting and resetting (or clearing) the pending thread latch are discussed below.

Further in FIG. 2, the context select logic unit 400 has at least five inputs. A first input receives interrupt signals, such as external interrupt signals from input/output devices or processors in an operation illustrated in FIG. 3. A second input of the unit 400 receives thread completion signals, preferably from the execution of an instruction as a part of a software processor embedded in the hardware of the system for completing threads in an operation illustrated in FIG. 4. A third input of the unit 400 receives dispatch-conditional-branch signals, which preferably connects to the corresponding system hardware components in an operation illustrated in FIG. 5. A fourth input of the unit 400 receives resolve-conditional-branch signals, which preferably connects to the corresponding system hardware components in an operation illustrated in FIG. 6. A fifth input of the unit 400 receives a set/reset pending thread signal. In one aspect of the invention, when an interrupt is received by the multi-threaded processor, the processor determines whether the hardware context is available for serving the interrupt, as clearly illustrated in FIG. 3. If it is available, the processor will provide the service for the interrupt. If it is not available, a new thread may be started and a pending thread signal is set or flagged for future execution of the service when a hardware context is made available. If the processor decides not to start a new thread for the interrupt, the interrupt service is completed on the running thread. The previously running thread prior to the interrupt is resumed.

Still referring to FIG. 2, the other three inputs of the unit 400 receive configuration signals, such as disable-context signals, reserve-context for alternate branch path signals, and reserve-context for primary branch path signals. These signals can be sent by execution of an instruction as part of a software processor embedded in the hardware of the system. It will be appreciated that the unit 400 has other inputs to receive the signals from various parts of the system 100.

The context select logic unit 400 has at least four outputs. A first output sends the interrupt to an available hardware context. A second output starts execution of the alternate branch path on the available hardware context. A third output for starting execution of the new waiting thread on the available hardware context. A fourth output for terminating a hardware context so as to free the hardware context.

Figure 3:
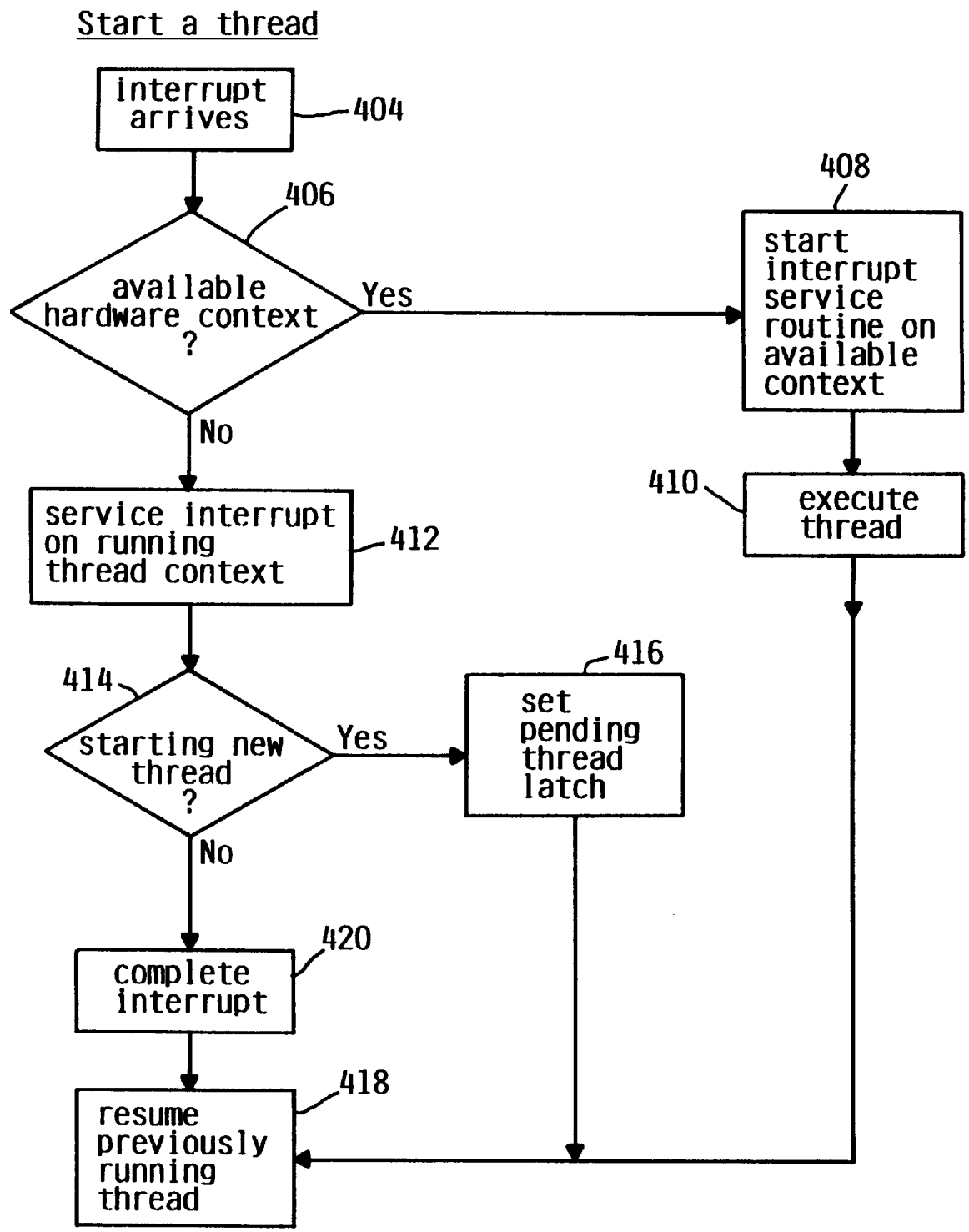
FIG. 3 is a flowchart illustrating an operation of starting a thread of instructions, generally consistent with the invention.

In FIG. 3, a flowchart of starting a thread operation is illustrated. When an external interrupt signal arrives in 404, the processor determines whether a hardware context is available in 406. If the hardware context, which is usable by a primary branch thread, i.e., not disabled or reserved for an alternate branch path, is available, an interrupt service routine is then started on the available hardware context in 408. Consequently in 410, the thread of instructions is executed on the available hardware context. If the hardware context is not available from box 406, the service on the running thread context is interrupted in 412. Then in block 414, the processor determines whether to start a new thread for the interrupt. If a new thread is started, a pending thread latch is set in box 416. The pending thread latch signal is sent to the context select logic unit 400 so that the new thread is in a waiting stage to be executed when a hardware context is later available. Then the operation returns to previous running thread in 418 before the interrupt. If the processor decides not to start a new thread in 414, the processor then completes service to the interrupt in 420 and then resumes the previous running thread in 418 before the interrupt.

It will be appreciated by one skilled in the art that the hardware architect will choose to implement some interrupts in this manner and others will be implemented without attempting to acquire a new context. The type of interrupt is indicated as part of the interrupt signal in 404. The context selection logic 400 implements this design decision. For example, an external interrupt is generally a request for the processor that is independent of the currently running threads and can start a new thread. A page fault interrupt is typically a request from a running thread for an operating system service. The interrupt handling will be done in the same hardware context as the related running thread since that thread would otherwise be blocked waiting for the operating system service.

Figure 4:
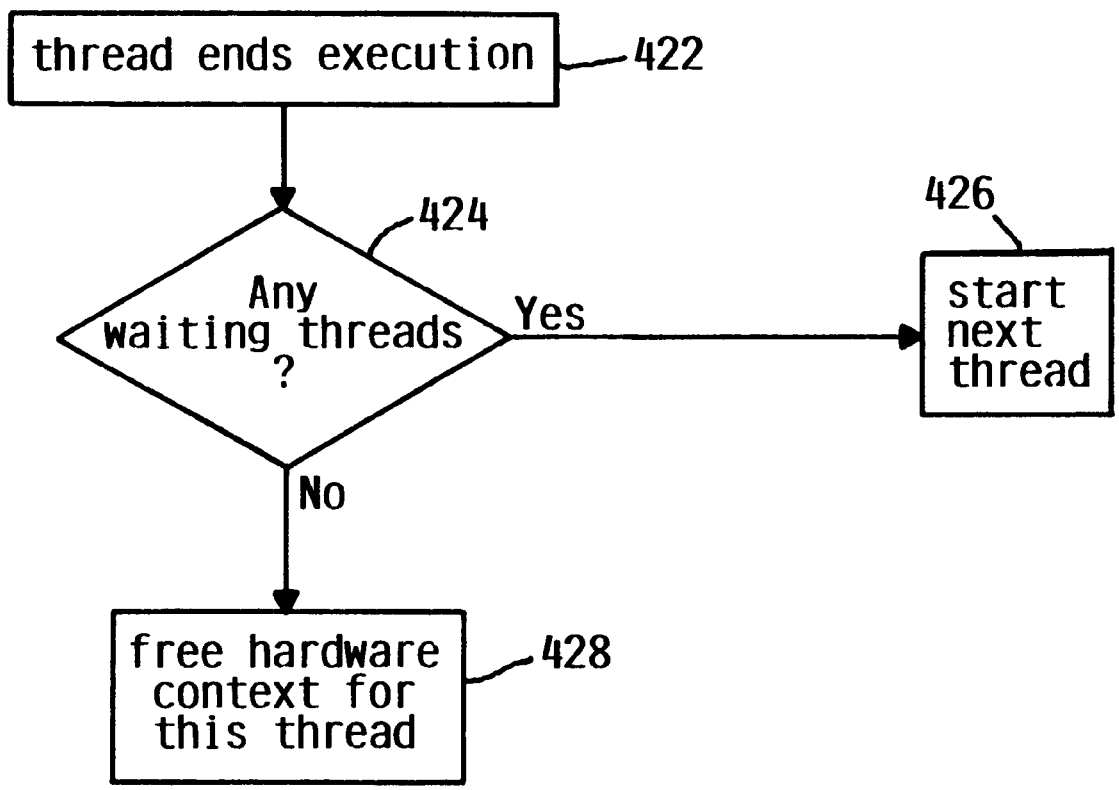
FIG. 4 is a flowchart illustrating an operation of ending a thread of instructions, generally consistent with the invention.

In FIG. 4, a flowchart of ending a thread operation is illustrated. When a thread ends execution in box 422, the processor determines whether there are any waiting threads in 424. If yes, the processor will start the next waiting thread in 426. If there are no waiting threads in 424, the processor will free the hardware context in 428.

Figure 5:
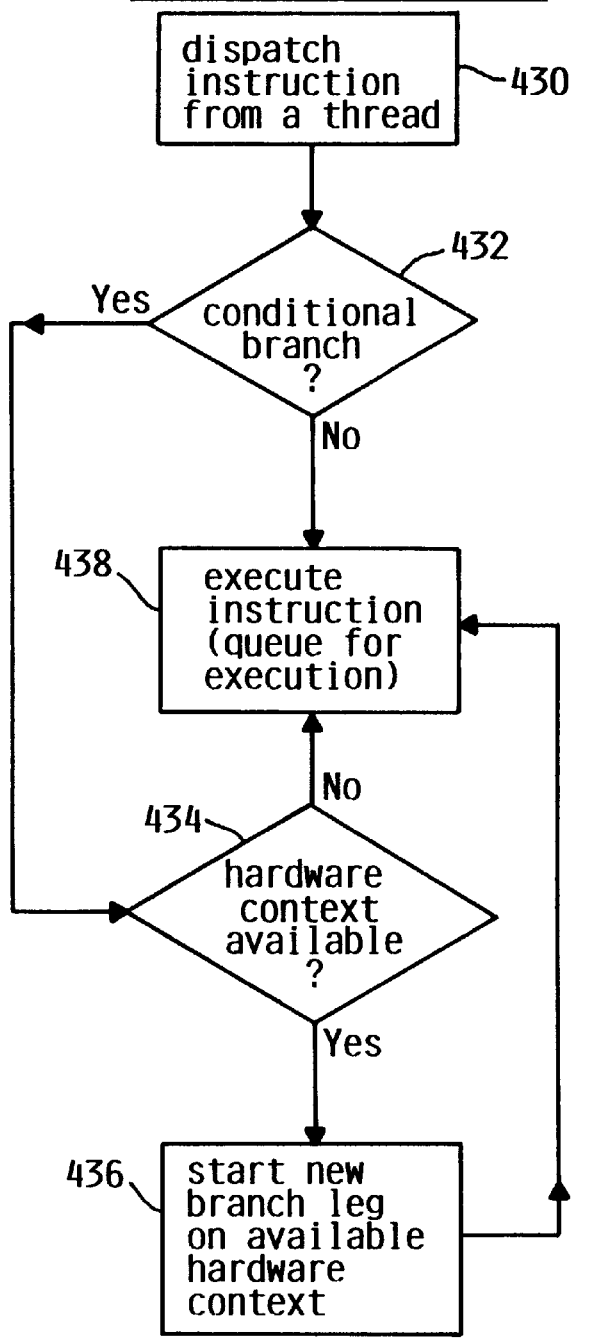
FIG. 5 is a flowchart illustrating in part an operation after dispatching a conditional branch instruction, generally consistent with the invention.

In FIG. 5, a flowchart of an operation after dispatching instructions from a thread is illustrated. When the processor dispatches instructions from a thread in box 430, the processor determines whether the thread has a conditional branch type of instruction in 432. If the thread has a conditional branch instruction, then the processor determines whether a hardware context, which is usable by an alternate branch path, i.e., not disabled or reserved for a primary branch path, is available in 434. If a hardware context is available, a new branch path as being the alternate branch path is started on the available hardware context in box 436. Then, the processor executes both branches of instructions. If a hardware context is not available, the processor selects execution of one branch path in 438. The selected branch path may be the primary branch path or the alternate branch path. Once the conditional branch is resolved, the processor determines whether the selected branch path is the correct branch path. The details regarding the operation after the conditional branch is resolved are discussed later in FIG. 6. Also, if the original thread is not a conditional branch, then the processor executes the instructions from the original thread in 438.

Figure 6:
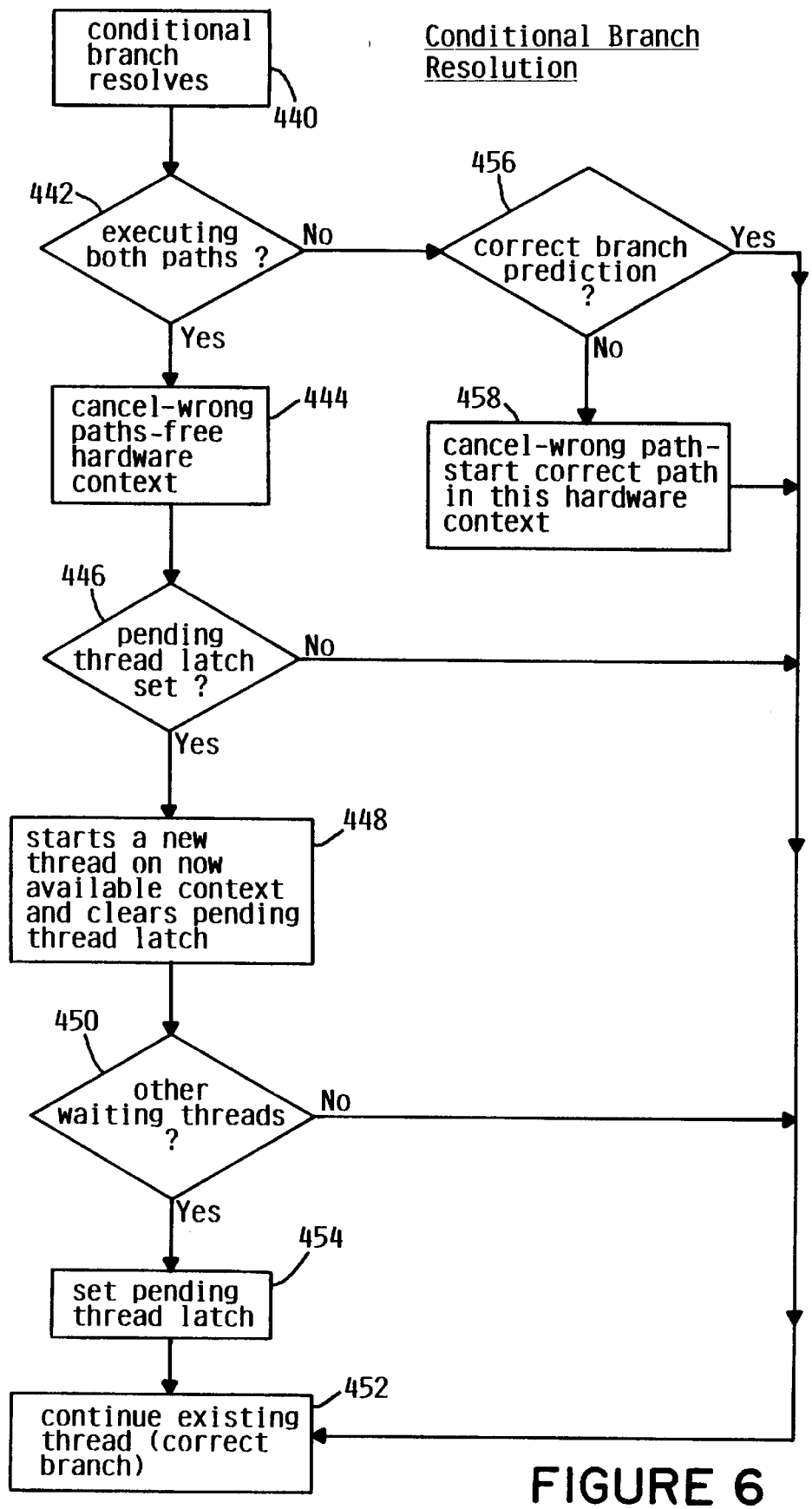
FIG. 6 is a flowchart illustrating an operation after a conditional branch resolves, generally consistent with the invention.

In FIG. 6, a flowchart of an operation after a conditional branch resolves is illustrated. When the processor resolves a conditional branch in box 440, i.e., a desired or correct branch path is determined by the past operations, the processor first determines whether both branch paths were executed before in 442, as above described in FIG. 5. If both branch paths were executed before, the processor cancels the undesired or wrong branch path in 444 and frees its hardware context. Then, the processor checks whether a pending thread latch was previously set in 446, as above described in FIG. 1. If the pending thread latch was set, the processor executes a waiting thread on the available hardware context in 448 and clears the pending thread latch. Next, the processor determines whether there are any other waiting threads in 450. If there are none, the processor continues execution of instructions on the correct branch path in 452. If there are other waiting threads in 450, the processor sends a signal to unit 400 to set the pending thread latch in 454. Back in block 446, if the processor finds that the pending thread latch is set, the processor directly goes to box 452 to continue execution of instructions on the correct branch path. Further, if only one branch path was selected and executed in box 442, as described in FIG. 5, the processor determines in box 456 whether the selected path is a correct branch path. If the selected branch path is the correct or desired branch path, the processor continues execution of instructions on the correct branch path in box 452. If the selected branch path is a wrong or undesired branch path from box 456, the processor cancels the wrong branch path which frees its hardware context, and starts execution instructions of the desired branch path on the available hardware context in 458. Then, the processor continues execution of instructions on the correct branch path in box 452.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method of computer processing, comprising the steps of:

(a) executing a first thread of instructions by a multi-threaded processor;

(b) receiving an interrupt by the processor;

(c) determining availability of hardware context for servicing the interrupt:

(1) if the hardware context is available, the processor starting an interrupt service on an available hardware context by executing an available thread for the interrupt service;

(2) if the hardware context is not available, the processor providing the interrupt service on the first thread and determining whether a new thread should be started: if a type of the interrupt requires a new thread to be started, a pending thread latch register is set so as to indicate that the new thread is on its waiting stage to be executed; if the type of the interrupt does not require the new thread to be started, the processor completes the interrupt service on the first thread; and (d) returning execution of the processor to where the first thread was interrupted.

2. The method of claim 1, further comprising the steps of:

(e) completing execution of the first thread by the processor;

(f) determining by the processor whether there is a waiting thread to be executed:
  (1) if there is a waiting thread to be executed, executing the waiting thread;
  (2) if there is no waiting thread to be executed, indicating that the hardware context used by the first thread is available.

3. A computer processor, comprising:
(a) a multithreaded processor arranged and configured for servicing an interrupt while executing a first thread of instructions; when a hardware context is not available for servicing the interrupt, the processor determining whether a new thread should be started for the interrupt: if a type of the interrupt requires a new thread to be started, a pending thread latch register is set so as to indicate that the new thread is on its waiting stage to be executed; if the type of the interrupt does not require the new thread to be started, the processor completing service for interrupt on the first thread; and
(b) the pending thread latch register operatively connected to the multithreaded processor, wherein when a hardware context is later available, the multithreaded processor checks whether the pending thread latch was previously set, if it was set, the processor executing the new thread corresponding to the previously set pending thread latch on the available hardware context.

* * * * *